US005509082A

United States Patent [19]

Toyama et al.

[11] Patent Number: 5,509,082

[45] Date of Patent: Apr. 16, 1996

[54] VEHICLE MOVEMENT MEASURING APPARATUS

[75] Inventors: Masakazu Toyama, Tokyo; Yuji Hasegawa, Yokohama, both of Japan

[73] Assignee: Matsushita Electric Industrial Co., Ltd., Osaka, Japan

[21] Appl. No.: 162,476

[22] Filed: Dec. 7, 1993

Related U.S. Application Data

[63] Continuation-in-part of Ser. No. 886,948, May 22, 1992, abandoned, and a continuation-in-part of Ser. No. 829,390, Feb. 3, 1992, Pat. No. 5,301,239.

[30] Foreign Application Priority Data

May 30, 1991 [JP] Japan .................................... 3-127144
Jul. 15, 1991 [JP] Japan .................................... 3-173620

[51] Int. Cl.[6] .............................. G06K 9/00; G08G 1/07; G08G 1/065; G08G 1/017

[52] U.S. Cl. .......................... 382/104; 340/917; 340/934; 340/937

[58] Field of Search ........................ 382/1, 104; 340/917, 340/935, 936, 937, 934

[56] References Cited

U.S. PATENT DOCUMENTS

| | | | |
|---|---|---|---|
| 3,195,126 | 7/1965 | Barker | 340/934 |
| 4,847,772 | 7/1989 | Michalopoulas | 364/436 |
| 5,161,107 | 11/1992 | Mayeaux et al. | 364/436 |
| 5,283,573 | 2/1994 | Takatou et al. | 340/937 |
| 5,296,852 | 3/1994 | Rathi | 340/933 |

FOREIGN PATENT DOCUMENTS

| | | | |
|---|---|---|---|
| 2158899 | 6/1990 | Japan | G08G 1/017 |
| 2284297 | 11/1990 | Japan | G08G 1/01 |

*Primary Examiner*—Leo Boudreau
*Assistant Examiner*—Matthew C. Bella
*Attorney, Agent, or Firm*—Watson Cole Stevens Davis

[57] ABSTRACT

A video camera is placed so as to overlook vehicles' attitudes at an intersection and in the vicinity of the intersection. Video signals provided by the video camera are sent to the main body of a vehicles movement measuring apparatus. An A/D converting unit in the main body converts the video signals into digital data. Digital data in two frames, one of which is taken a certain length of time after the other, is stored in image memory units. Another image memory unit stores data of an input image including no vehicle image. An image data processing unit performs image processing on the data stored in the image memory units and extracts data about vehicles from the processed data. Information relating to speeds, tracking, etc., of vehicles is output from a data input-output unit. This processing of the obtained image data measures vehicles' movement as the degree of traffic jam or the smoothness of the downstream traffic flow on a road with detection of data regarding vehicles presence or speeds.

15 Claims, 6 Drawing Sheets

VEHICLE MOVEMENT MEASURING APPARATUS

This is a Continuation-in-Part of U.S. Ser. Nos. 07/886,948 (filed May 22, 1992), now abandoned and 07/829,390 (filed Feb. 3, 1992), now U.S. Pat. No. 5,301,239, the disclosures of which are incorporated herein by reference.

BACKGROUND OF THE INVENTION

1. Field of the Invention

The present invention relates to a vehicles movement measuring apparatus which is placed above a road and measures and collects traffic data about the road regarding the number of vehicles passing below the apparatus, speeds of such vehicles, the types thereof (e.g. compact cars or large size cars), and further necessary information.

2. Description of the Related Art

A conventional vehicles movement measuring apparatus measures and outputs data regarding the number of vehicles passing below the apparatus, speeds of such vehicles, the types thereof (e.g. compact cars or large size cars), etc., by taking images of the motor vehicles, their attitudes and the background, and image-processing the original vehicle image data and the background image data.

Such an apparatus is disclosed in Japanese Patent Unexamined Publication Nos. 2-158899 and 2-284297.

However, such a conventional vehicles movement measuring apparatus can only determine the number of passing motor vehicles, their speeds and the vehicle types; it does not detect the degree of traffic jams on the road. Thus, the conventional apparatus is not satisfactory in the measuring of vehicles attitudes.

Also, since the conventional apparatus can only determine the number of passing motor vehicles, their speeds and the vehicle types, the conventional vehicles movement measuring apparatus can not detect how heavy the traffic is on the road ahead, which is also important information. For example, this information is important where the output of vehicle sensors is used to determine the output timing of traffic signal controllers located at an intersection of roads. Conventionally, only data regarding the traffic upstream from the intersection is used. Therefore, if the road downstream from the intersection is congested, the output timing for green lights thus determined becomes useless.

Since the conventional vehicle sensors only detect and collect data of the upstream traffic, sensors must be provided at a plurality of locations if there is a need for data on the traffic downstream from an intersection as well. However, it is not possible to provide sensors at all of the desired locations, because of local conditions or on account of considerations of townscape or landscape beauty.

SUMMARY OF THE INVENTION

The present invention is intended to solve the above-noted problems. It is an object of the present invention to provide a vehicles movement measuring apparatus which measures and collects not only correct information on vehicles for each lane, but also other necessary traffic information regarding the road by using image data supplied by at least one video camera.

It is another object of the present invention to provide a vehicles movement measuring apparatus which measures and collects not only accurate information on the number of passing vehicles, their speeds and types (e.g. compact or large size), but also other necessary information, for example, information on the smoothness of traffic flow, by using image data supplied by two video cameras.

It is still another object of the present invention to provide a traffic detecting apparatus which measures and collects not only accurate information on the number of passing vehicles, their speeds and types (e.g. compact or large size), but also other necessary information, for example, information on smoothness of downstream traffic flow, by using image data supplied by one video camera.

To achieve the above objects, a video camera is provided which measures the number of vehicles passing along each lane, their speeds and types (e.g. compact or large size), and another camera is provided which determines the degree of traffic jam (congestion). The image data from the two video cameras are separately processed to provide data about the number of passing vehicles, their speeds and types (e.g. compact or large size), and data about the degree of traffic congestion on the road.

A vehicles movement measuring apparatus constructed as described above provides the following advantage. The information on the degree of traffic congestion can be used to determine the output timing of a traffic signal controller, and the data of the number of passing vehicles and the vehicle speeds can be used to determine whether the output timing of the traffic signal controller should be changed. Thus, the number of inappropriate output timings is substantially reduced, and fine control of traffic signals can be achieved, thus contributing to the elimination of traffic congestion.

Also, to achieve the above objects, an area is defined for measuring the number of vehicles passing along each lane, their speeds and types (e.g. compact or large size), and another area is defined for measuring the smoothness of traffic flow, i.e., clogging, of downstream traffic. The image data taken from the two areas are separately image-processed to provide data about the number of passing vehicles, their speeds and types (e.g. compact or large size) and data about the smoothness of downstream traffic flow.

A traffic detecting apparatus thus constructed according to the present invention provides the following advantages. First, since the smoothness of downstream traffic flow can be detected, such information can be fed back to a traffic signal controller. Second, since information regarding the smoothness of downstream traffic flow can be used to vary the output timing for green lights of the traffic signal controller, the green light duration can be set at an appropriate length, thereby serving to eliminate traffic congestion. Third, since a variety of traffic information can be obtained from image data provided by one video camera, a comparatively great effect can be achieved by using fewer sensors, even at locations with heavy traffic such as large intersections. Fourth, since a video camera is placed above the roadside, it does not significantly affect the townscape or landscape beauty. Fifth, a variety of traffic information is provided by one vehicles movement measuring apparatus.

The additional details of the above elements recited in the description of the preferred embodiments set forth hereinbelow are also embraced within the present invention.

Further objects, features and advantages of the present invention will become apparent upon review of the following description of the preferred embodiments with reference to the attached drawings.

DESCRIPTION OF THE PREFERRED EMBODIMENTS

The first embodiment of the present invention will be described below with reference to the drawings.

Figure 1:
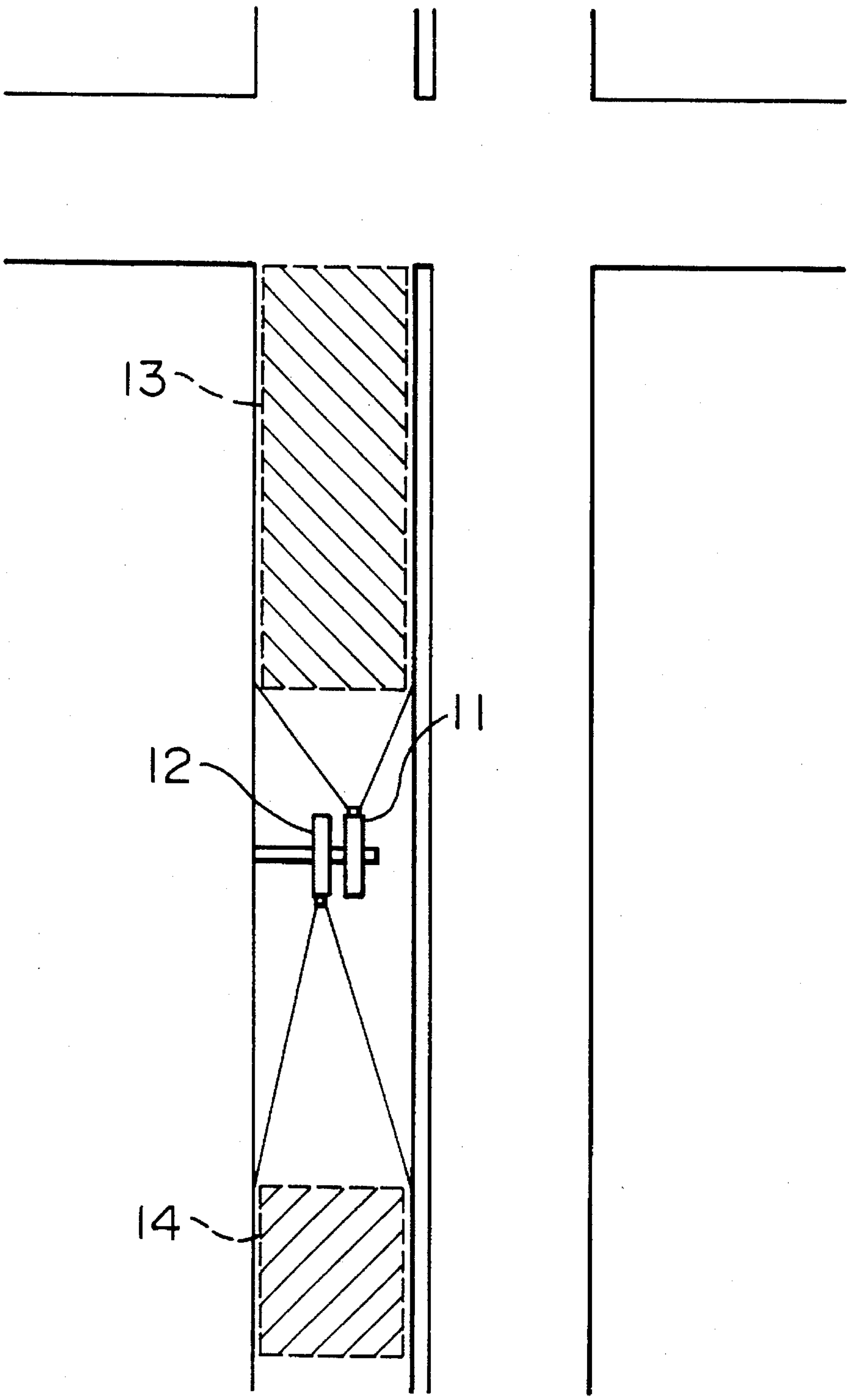
FIG. 1 is an illustration of video camera positioning and detecting areas according to the first embodiment of the present invention.

FIG. 1 shows video cameras 11 and 12, a vehicle tracking area (video imaging area) 13, and a traffic jam determining area (video imaging area) 14. The video camera 11 is directed down a lane, i.e., in the direction in which vehicles are going. The video camera 12 is directed up the lane, i.e., in the direction from which vehicles are coming. Image data of the vehicle tracking area 13 taken by the video camera 11 is used to determine the speeds, presence, types, etc., of the individual vehicles, while image data of the traffic jam determining area 14 is used to detect the number of vehicles present in the area in order to determine whether or not the measured road is heavily congested (jammed).

Figure 2:
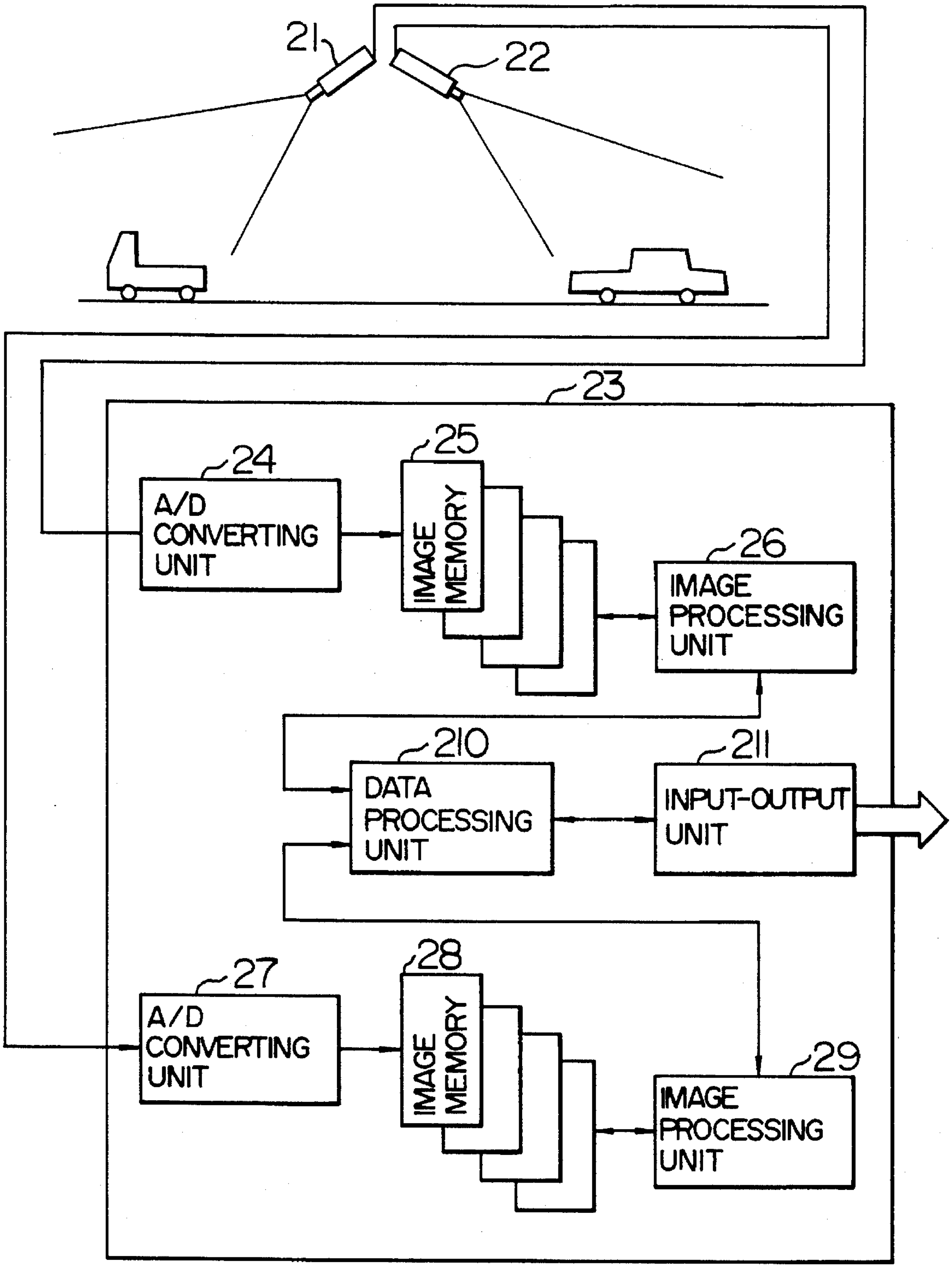
FIG. 2 is a block diagram of a vehicles movement measuring apparatus according to the first embodiment of the present invention.

FIG. 2 illustrates signal processing according to this embodiment. The figure shows the first video camera 21, the second video camera 22, a main body of a vehicles movement measuring apparatus 23, A/D converting units 24 and 27, which convert analog data into digital data, image memory units 25 and 28, which store image data, image data processing units 26 and 29, a data processing unit 210 which performs processing of the image data obtained from both the first and second video cameras 21, 22, and a data input-output unit 211.

The operation of the vehicles movement measuring apparatus according to this embodiment will now be described. Video signals provided by the video camera 21 are transferred to the signal processing means, i.e., the main body of the vehicles movement measuring apparatus 23. The A/D converting unit 24 converts these video signals into digital image data. Two frames of digital image data, one of which is taken a certain length of time after the other (e.g., at an interval of 100–200 seconds and preferably 133 seconds), are stored in the image memory unit 25. The image memory unit 25 also stores data of an image including no vehicle image (background data). In one embodiment, as more fully explained in co-pending U.S. Ser. No. 07/829,390 (filed Feb. 3, 1992), this background data is changed based on the time zones of morning, daytime and night and weather conditions such as clear, cloudy and rainy, so that the background data needs to be updated in accordance with these conditions in order to accurately decide the state of the road surface. The image data processing unit 26 performs image processing, using the data stored in the image memory unit 25, so as to extract vehicles images. As an example of such processing, the following description is provided. First, a "frame differential" (i.e., comparison of pixels between frames) is taken between the two frames of image data stored in memory 25. As mentioned above, the two frames of image data have been picked up at a predetermined interval. By taking this frame differential, mobile objects (cars, in this case) can be extracted. By comparing the pixels of the two frames and measuring the number of picture elements (pixels) which change, e.g., as to their luminance values, between the two frames, it is possible to distinguish between states (1) where at least one moving car exists (i.e., the two frames do not coincide with the background data and have at least a predetermined amount of difference relative to each other), (2) where no cars are present (i.e., the two frames correspond to the background data), and (3) where a stationary car is present (e.g., the two frames correspond to each other and not to the background data). A distinction of the size of moving cars (e.g. large and small size) is made based on the number of picture elements which change between the frames. In other words, a larger number of pixels will change when a large moving car is present than when a small moving car is detected. Such processing is repeated in order to track vehicles and determine their speeds. That is, to determine vehicle speed, a position of a vehicle at time $T_1$ in the first frame is first determined and then the position of the vehicle at time $T_2$ in the second frame is determined; the pixels relating to a particular vehicle are isolated from those for other vehicles by realizing that the camera will detect areas in front and behind the particular vehicle that correspond to the background data. For example, to determine a first vehicle s position in a frame, scanning processing is performed by sequentially analyzing the frame starting at the edge most upstream and identifying the position within the frame of the first set of pixels that differs from the corresponding position within the previous frame. To determine the first vehicle's position in the next frame, a similar sequential analysis is performed. The vehicle s speed is determined by using the equation:

$$\text{speed} = \frac{\Delta\ \text{position}}{T_2 - T_1}$$

To determine a second vehicle's position in a frame, the scanning processing is continued by sequentially analyzing the frame downstream from the first vehicle. Once data corresponding to background data is detected, it is determined that this represents a space after the first vehicle. Subsequently, processing similar to that described above is carried out to detect the position and speed of the second vehicle. A similar process is performed to determine the location and speed of further vehicles.

The vehicle positions and speeds may also be determined by detecting positive (+) luminance changes between two digital data frames, as discussed later.

Similarly, video signals provided by the second video camera 22 are converted into digital image data by the A/D converting unit 27. The image data is stored in the image memory unit 28. The image data processing unit 29 then performs image processing, using the data stored in the image memory unit 28, in order to determine the degree of traffic congestion. The traffic condition may be classified in accordance with Table 1:

TABLE 1

| State of the Road | Flag of the state of the road surface |
|---|---|
| No vehicles present | 0 |
| Moving vehicle(s) is/are present (Small) | 1 |
| Moving vehicle(s) is/are present (Large) | 2 |
| Stationary vehicle(s) is/are present | 3 |

To obtain the data for classification, similar processing to that described above with respect to processing unit 26 is performed. That is, first, a frame differential is taken between two frames of image data stored in memory 28. As with the image processing carried out by unit 26, the two frames of image data are picked up at a predetermined time interval. By taking this frame differential, data relating to mobile objects (cars, in this case) can be extracted. By comparing the pixels of the two frames and measuring the number of pixels which change between the frames, it is possible to distinguish between states (1) where at least one moving car exists, (2) where no cars are present, and (3) where a stationary car is present. A distinction regarding the size of moving cars (e.g. large and small size) is made based on the number of picture elements which change between the frames, in the same manner as discussed above.

The data about the speeds and presence of the vehicles and the degree of traffic jam (e.g. represented by the different conditions of Table 1) from both unit 26 and unit 29 are transferred to the data processing unit 210. Unit 210 then processes this data to generate control signals to be output to the traffic signal controller. The control signals are generated so as to optimize the duration of the green light signals of the traffic signal so as to reduce traffic congestion. That is, if heavy congestion downstream from the traffic signal is determined, the green light duration for traffic moving in the road transverse to the detected road is increased while that in the detected road is decreased. Furthermore, unit 210 feeds the traffic jam (congestion) information (e.g. of Table 1) to data input-output unit 211 which transmits it to a traffic control center. Thus, traffic information from data processing unit 210 is outputted from the data input-output unit 211 to the control center.

Figure 3:
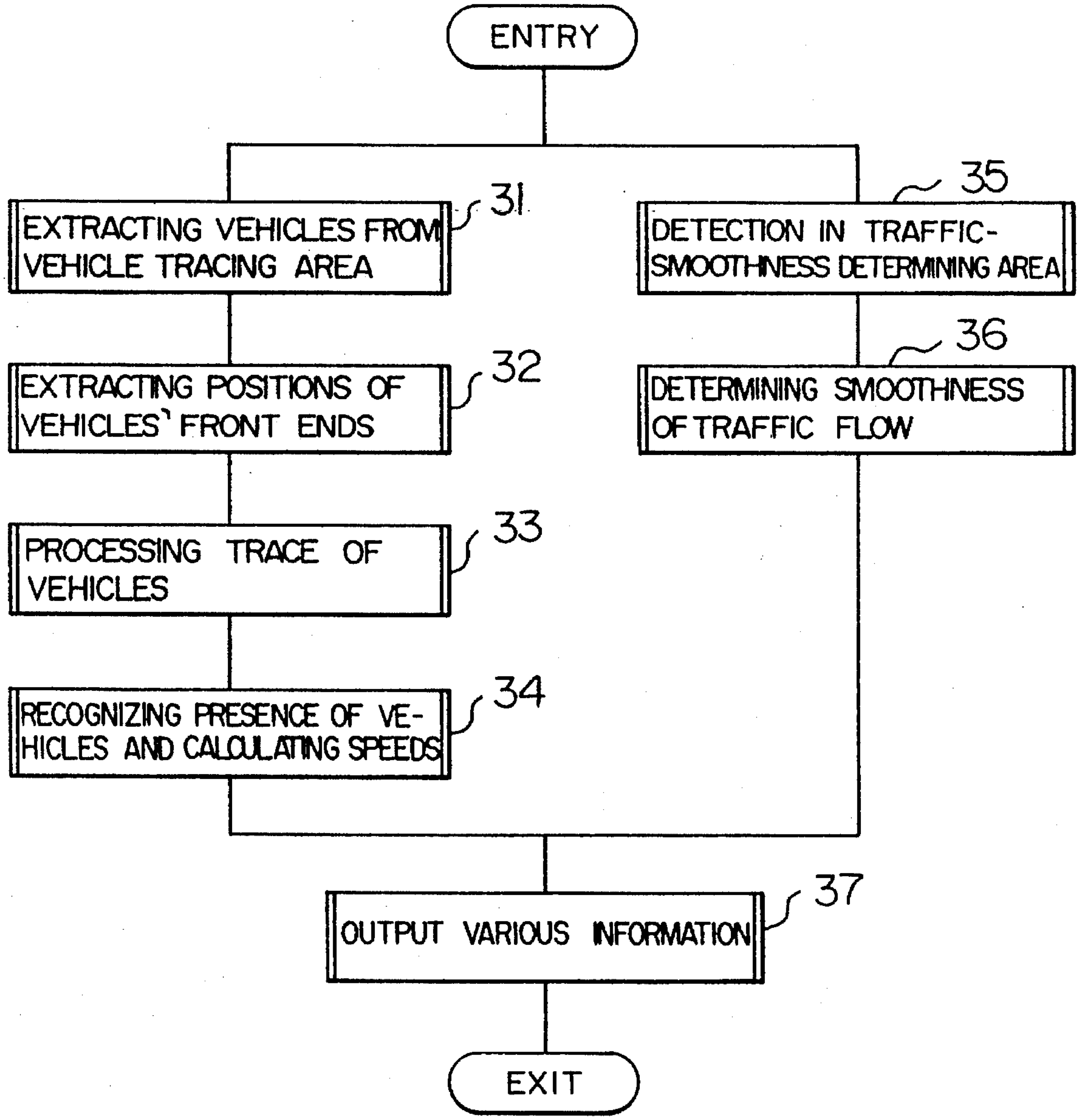
FIG. 3 is a flowchart of an operation according to the first embodiment of the present invention.

The basic processing flow according to the present invention will be described below with reference to FIG. 3. Image data of the vehicle tracking area are processed, for example, by differential or difference processing, so as to extract vehicle images (Step 31). The extraction result is analyzed so as to extract data about the positions of front ends of vehicles (Step 32). This may be accomplished e.g. by frame differential operation. That is, positive (+) luminance changes between the two frames of digital data are used to identify the front edge portion of a moving vehicle (as more fully explained in U.S. Ser. No. 07/829,390, filed Feb. 3, 1992). The current data about the front ends of vehicles are compared with the data about the front ends and speeds accumulated up to the previous operational cycle in order to perform tracking of the vehicles (Step 33). The presence of the vehicles which have been tracked is recognized and the speeds thereof are calculated (Step 34). On the other hand, image processing, such as differential or difference processing, is performed on the image data from the traffic jam degree determining area so as to determine the presence of the vehicles (Step 35). The current data about presence of the vehicles are compared with the data about presence of the vehicles accumulated up to the previous operational cycle in order to determine whether or not the road is jammed (Step 36). The information thus obtained is outputted (Step 37).

Since the vehicles movement measuring apparatus according to this embodiment determines the degree of traffic jam via unit 29, as explained above, such information can be used to determine the output timing of a traffic signal controller. Further, the data regarding the number of passing vehicles and the vehicle speeds obtained via unit 26 can be used to determine whether to change the output timing of the traffic signal controller. Thus, the number of inappropriate output timings is substantially reduced, and fine control of traffic signals can be achieved, thereby serving to eliminate traffic congestion.

Figure 4:
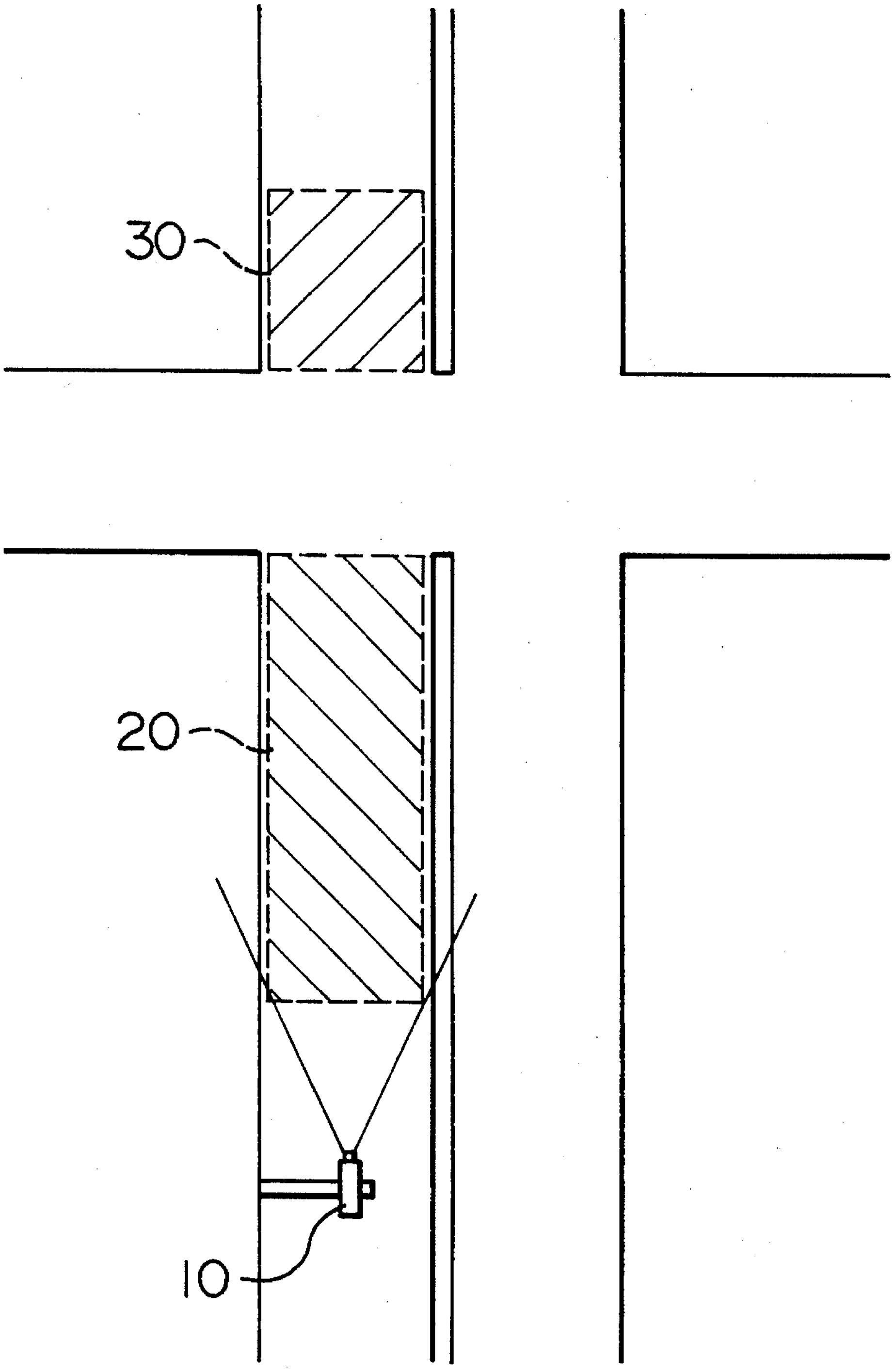
FIG. 4 is an illustration of video camera positioning and detecting areas according to the second embodiment of the present invention.

FIG. 4 illustrates the video camera positioning according to the second embodiment of the present invention.

Referring to FIG. 4, a video camera 10 is positioned above a road so as to take images of vehicles near an intersection. The video camera 10 covers a vehicle tracking area (vehicle imaging area) 20 which is immediately upstream of the intersection, and a downstream congestion determining area (vehicle imaging area) 30 which is immediately downstream of the intersection. The video camera 10 is directed in the direction of movement of traffic. Image data obtained from the vehicle tracking area 20 are used to determine the presence, speeds and types of individual vehicles, in the same manner as that discussed above in the first embodiment. Image data obtained from the downstream congestion determining area 30 are used to detect the presence of vehicles in this area in order to determine whether or not the road ahead is congested, in the same manner as that discussed above in the first embodiment.

Figure 5:
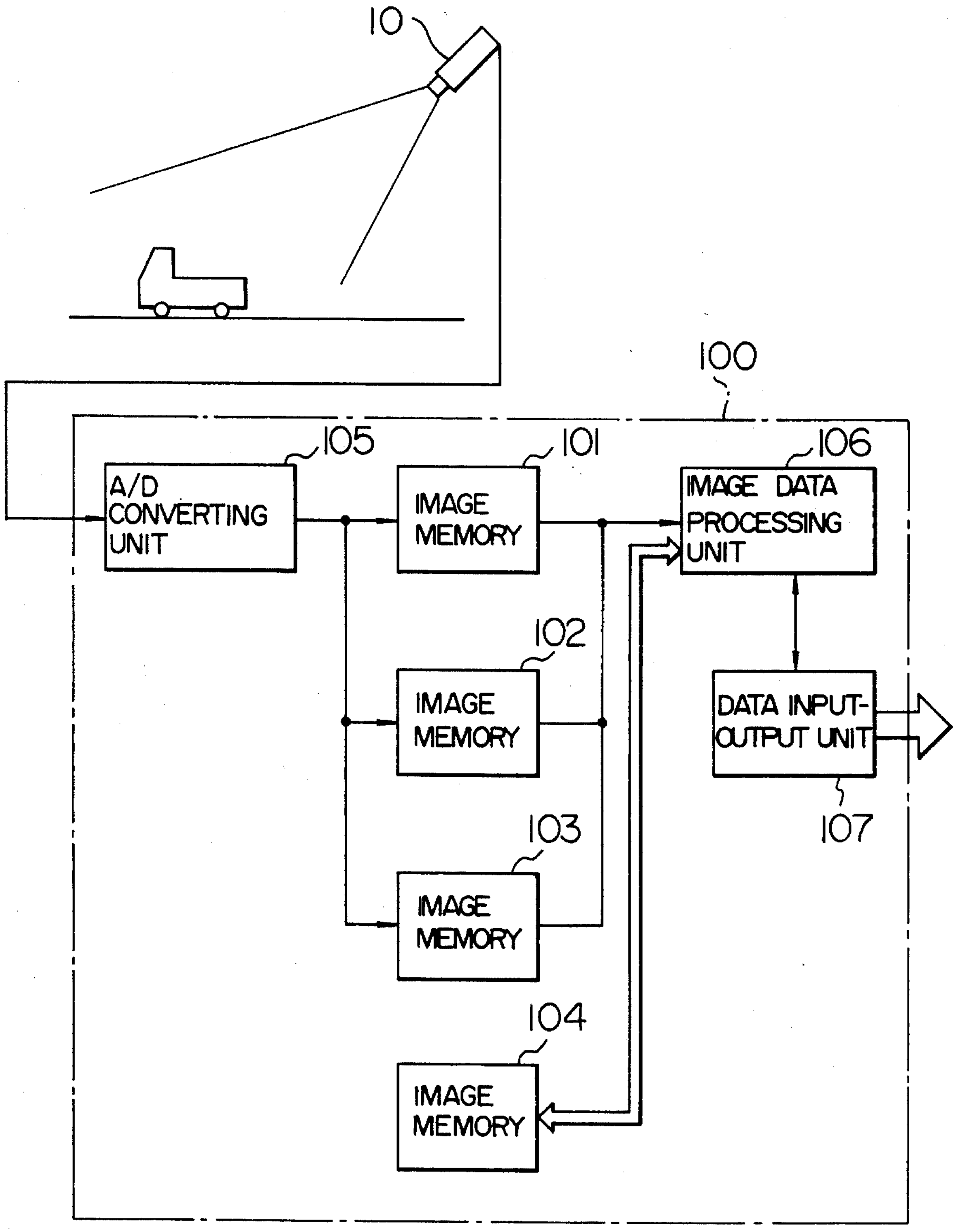
FIG. 5 is a block diagram of a vehicles movement measuring apparatus according to the second embodiment of the present invention.

FIG. 5 illustrates a construction of a traffic detecting apparatus according to the second embodiment of the present invention. FIG. 5 shows a video camera 10 and a main body 100 of the traffic detecting apparatus. The main body 100 comprises: image memory units 101, 102 and 103 for storing digitized input image data; an image memory unit 104 for storing processed image data; an A/D converting unit 105 (analog-to-digital) for converting video data; an image data processing unit 106; and a data input-output unit 107.

The operation of the traffic detecting apparatus according to this embodiment will be described below.

Video signals provided by the video camera (10) are sent to the main body of the traffic detecting apparatus 100. The A/D converting unit 105 which converts the video signals into digital data. Two frames of digital data, one of which is taken a certain length of time after the other, are stored as first and second input image data in the image memory units 101 and 102, respectively. The image memory unit 103 stores data of an input image including no vehicle image (background data). In one embodiment, this background data is changed based on the time zones of morning, daytime and night and weather conditions such as clear, cloudy and rainy, so that the background data needs to be updated in accordance with these conditions in order to accurately decide the state of the road surface. The image data processing unit 106 separately performs image processing on the data from the vehicle tracking area 20 and on the data from the downstream congestion area 30, both of which are stored in the image memory units 101,102 and 103 (i.e., unit 106 separately processes the portion of the frame including the vehicle tracking area 20 from the portion of the frame including the downstream congestion area 30). This image processing may be performed in similar fashion to the processing described in the first embodiment. Then, the image processing unit 106 writes the processed image data from the two areas into the image memory unit 104, and extracts data about vehicles from the image data stored in the memory unit 104. By continuously repeating such processes, information about the speeds, tracking, etc., of vehicles is output from the data input-output unit 107. Also, the state of the current traffic on the road is determined, and, based on such information, the background data is renewed.

Figure 6:
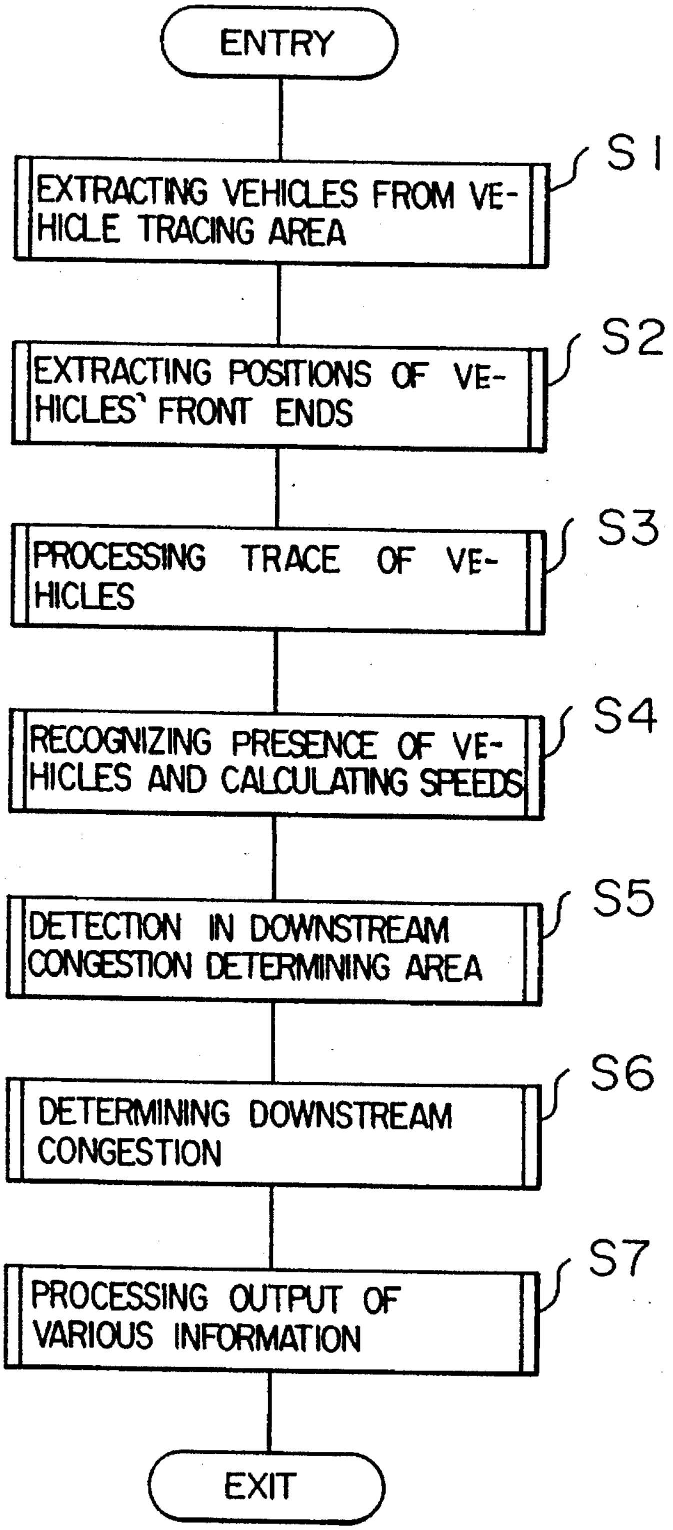
FIG. 6 is a flowchart of an operation of a vehicles movement measuring apparatus according to the second embodiment of the present invention.

The flow of the operation according to this embodiment will be described below with reference to FIG. 6.

Image data from the vehicle tracking area is processed, for example, by differential or difference processing, so as to extract vehicle images (Step S1). The extraction result is analyzed so as to extract data about the positions of the front ends of vehicles (Step S2). The current data about the front ends is compared with the data about the front ends and speeds accumulated up to the previous operational cycle in order to perform tracking of the vehicles (Step S3). The presence of the vehicles which have been tracked is recognized and the speeds thereof are calculated (Step S4). Then, image processing, such as differential or difference processing, is performed on the image data from the downstream congestion determining area so as to determine presence of the vehicles (Step S5). The current data about presence of the vehicles is compared with the data about presence of the vehicles accumulated up to the previous operational cycle in order to determine whether or not the road ahead is congested (Step S6). The information thus obtained is outputted (Step S7). The above described processing may be carried out in a similar fashion to that described in connection with the first embodiment.

Since the vehicles movement measuring apparatus according to this embodiment determines whether or not the road ahead is congested, an output timing for a green light of the traffic signal controller can be varied by using such congestion information in order to set green light duration to an appropriate length, thereby assisting in elimination of traffic congestion. Also, according to this second embodiment, a variety of traffic information can be obtained by using one video camera.

As understood from the above description of the preferred embodiments, a vehicles movement measuring apparatus according to the present invention not only provides information about the number, speeds, types, etc., of vehicles, but also provides information about smoothness of traffic flow near the apparatus or downstream therefrom, which information can be used to determine an efficient output timing for a traffic signal controller. Since such a variety of traffic information can be provided by using one apparatus, it is unnecessary to place many apparatuses at a particular location, such as an intersection, so that surrounding townscape or landscape beauty will not be substantially affected.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A vehicles movement measuring apparatus comprising:

a video camera, oriented to face in a direction corresponding to a downstream direction of traffic flow along a road, for outputting first video signals indicative of a first video imaging area of said road and second video signals indicative of a second video imaging area of said road, said first and second video imaging areas being spaced apart from one another and said first video imaging area being located closer than said second video imaging area to said video camera;

A/D converting means for converting said first and second video signals of said first and second video cameras into first and second digital image data;

a plurality of image memory means for separately storing said first and second digital image data, wherein a first one of said plurality of said image memory means stores said first digital image data, and a second one of said plurality of said image memory means stores said second digital image data; and image processing means for processing, in response to passage of time, (i) said first digital image data stored in said plurality of image memory means so as to provide data on presence and movement of vehicles within said first imaging area and (ii) said second digital image data stored in said plurality of image memory means so as to provide data on a degree of traffic jam within said second imaging area.

2. A vehicles movement measuring apparatus according to claim 1, wherein said first digital image data comprise two frames of digital image data corresponding to said first video imaging area and taken a predetermined length of time apart from one another, and said plurality of image memory means stores third digital image data comprising background data of said first video imaging area with no vehicle image therein.

3. A vehicles movement measuring apparatus according to claim 2, wherein said image processing means performs said processing of said first digital image data by comparing corresponding pixels in said two frames of digital image data and said third digital image data which comprises said background data.

4. A vehicles movement measuring apparatus according to claim 3, wherein said image processing means compares said corresponding pixels by measuring luminance values of said corresponding pixels.

5. A vehicles movement measuring apparatus according to claim 4, wherein said image processing means measures positive changes of said luminance values.

6. A vehicles movement measuring apparatus according to claim 3, wherein said image processing means, in response to a result of comparison of said corresponding pixels, determines whether (a) said two frames of digital image data coincide with said third digital image data and (b) said two frames of digital image data have at least a predetermined amount of difference relative to one another.

7. A vehicles movement measuring apparatus according to claim 6, wherein said predetermined amount of difference is dependent upon a size of vehicles present in said first video imaging area.

8. A vehicles movement measuring apparatus according to claim 1, wherein said data on presence and movement includes data on speed of vehicles within said first imaging area.

9. A vehicle movement means apparatus according to claim 1, wherein said data on a degree of traffic jam and said data on presence and movement of vehicles include control data for controlling switching of at least one set of traffic signals provided for said road.

10. A vehicles movement measuring apparatus according to claim 1, wherein said second digital image data comprise two frames of digital image data corresponding to said second video imaging area and taken a predetermined length of time apart from one another, and said plurality of image memory means stores third digital image data comprising background data of said second video imaging area with no vehicle image therein.

11. A vehicles movement measuring apparatus according to claim 10, wherein said image processing means performs said processing of said second digital image data by comparing corresponding pixels in said two frames of digital image data and said third digital image data which comprises said background data.

12. A vehicles movement measuring apparatus according to claim 11, wherein said image processing means compares said corresponding pixels by measuring luminance values of said corresponding pixels.

13. A vehicles movement measuring apparatus according to claim 12, wherein said image processing means measures positive changes of said luminance values.

14. A vehicles movement measuring apparatus according to claim 11, wherein said image processing means, in response to a result of comparison of said corresponding pixels, determines whether (a) said two frames of digital image data coincide with said third digital image data and (b) said two frames of digital image data have at least a predetermined amount of difference relative to one another.

15. A vehicles movement measuring apparatus according to claim 14, wherein said predetermined amount of difference is dependent upon a size of vehicles present in said first video imaging area.

* * * * *